United States Patent [19]

Tuck, Jr.

[11] 4,270,441
[45] Jun. 2, 1981

[54] PUMP DIAPHRAGM

[75] Inventor: Alan D. Tuck, Jr., Upland, Calif.

[73] Assignee: Wilden Pump & Engineering Co., Colton, Calif.

[21] Appl. No.: 16,426

[22] Filed: Mar. 1, 1979

Related U.S. Application Data

[63] Continuation-in-part of Ser. No. 956,189, Oct. 30, 1978.

[51] Int. Cl.³ .............................................. F01B 19/00
[52] U.S. Cl. .................................... 92/102; 92/98 R; 92/103 SD
[58] Field of Search ............... 92/99, 100, 102, 98 D, 92/104, 98 R, 103 SD; 277/167.5, 207 R

[56] References Cited

U.S. PATENT DOCUMENTS

| | | | |
|---|---|---|---|
| 1,338,080 | 4/1920 | Hodgson | 92/102 |
| 2,339,876 | 1/1944 | Phillips | 92/98 R |
| 2,550,672 | 5/1951 | Chyba | 92/102 |
| 2,678,663 | 5/1954 | Chyba | 92/102 |
| 2,741,205 | 4/1956 | Paulton | 92/98 R |
| 2,786,423 | 3/1957 | Coffey | 92/102 |
| 3,872,777 | 3/1975 | Mastis | 92/99 |
| 3,911,796 | 10/1975 | Hull | 92/99 |
| 3,982,559 | 9/1976 | Ochs | 92/103 SD |
| 4,035,107 | 7/1977 | Kesten | 92/102 |

Primary Examiner—Abraham Hershkovitz
Attorney, Agent, or Firm—Lyon & Lyon

[57] ABSTRACT

A diaphragm configuration is disclosed for an air-driven pump. The diaphragm includes concentric ribs on the pressure side of the flexure portion thereof. This has been found to extend the life of diaphragms made of relatively brittle materials such as synthetic resin polymers. A ridge is provided on the surface of the diaphragm where sealing is to occur as a means for increasing the sealing capability of the synthetic resin polymer material.

4 Claims, 2 Drawing Figures

PUMP DIAPHRAGM

This is a continuation-in-part of U.S. Application Ser. No. 956,189, filed Oct. 30, 1978 and entitled PUMP DIAPHRAGM.

BACKGROUND OF THE INVENTION

The present invention relates to diaphragms for pressure driven pumps.

Air driven diaphragm pumps have found great utility in the pumping of materials and powders which have any one of the properties of being very non-homogenous, very viscous, very active chemically and very dirty. In view of the wide range of applications of such pumps, it is necessary to provide a wide range of construction materials which are not chemically sensitive, not easily abraded or not easily cut by the substances and mixtures passing through the pump. One group of diaphragm materials which has been found to exhibit multiple advantages in this regard are synthetic resin polymers, some of which are offered for sale under the trademark TEFLON. However, such materials also are relatively rigid and have a tendency to fail along defined distress lines under repeated flexure. Consequently, such materials have been generally felt to be economically unsuitable for use in such situations.

In the Applicant's own experience, diaphragms having a basic configuration like that of the present invention without the addition of the ribs of the present invention fail due to cracking along radial lines of the diaphragm in a pump. Thus, TEFLON diaphragms have been found to be very expensive because of both the initial cost and the short life.

Another problem associated with the relatively hard synthetic resin polymer materials is the inability of these materials to seal with surfaces which have not been machined to a smooth surface. To overcome this problem, great pressure has generally been required to achieve a seal without the use of mastic or the like. The use of mastic is often undesirable because of the harsh environment requiring the special polymer in the first place.

SUMMARY OF THE INVENTION

The present invention is directed to a diaphragm which can be used with relatively inflexible materials such as TEFLON. The present invention is able to improve the capability of the diaphragm to seal against a surface which has not been machined smooth. Naturally, it will also work with smooth surfaces. The present device can also substantially increase the life of such diaphragms which heretofore have experienced early failure due to radial cracking.

Enhanced sealing has been achieved by using a small ridge at the point where the diaphragm is clamped to the shell of the pump. The shell does not have a corresponding groove. The ridge is also offset from the center of the clamping groove so that predictable deformation is achieved.

To increase the life of such TEFLON diaphragms, it has been found that concentric ribs provide sufficient stiffness in the circular direction while allowing relatively free radial extension of the diaphragm.

Accordingly, it is an object of the present invention to provide an improved diaphragm for diaphragm pumps.

It is another object of the present invention to provide a pump diaphragm with enhanced sealing capability.

Other and further objects and advantages will appear hereinafter.

DETAILED DESCRIPTION OF THE PREFERRED EMBODIMENT

Figure 1:
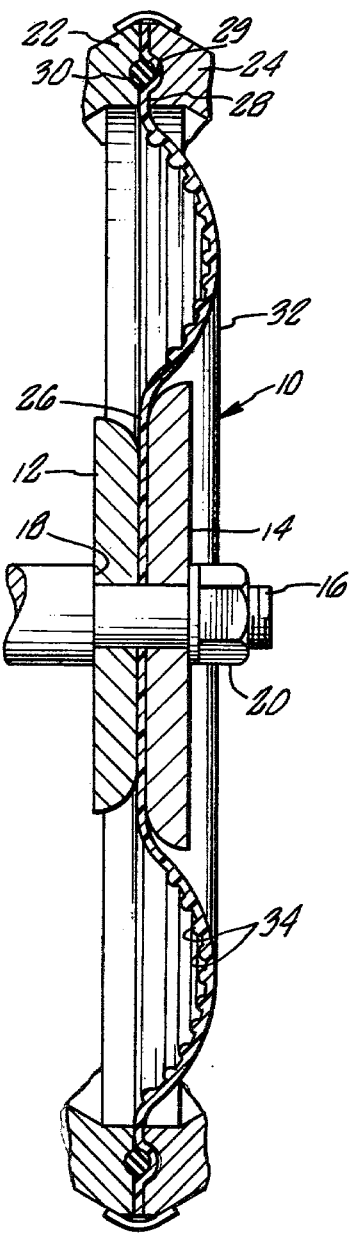
FIG. 1 is a cross-sectional side view of a diaphragm of the present invention shown with the immediately adjacent parts of an air driven diaphragm pump.
Figure 2:
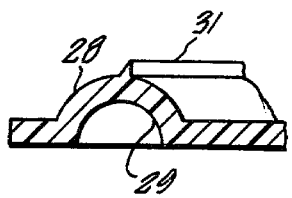
FIG. 2 is a detailed cross-section of the diaphragm sealing rim.

Looking to the drawing, a diaphragm, generally, designated 10 is illustrated in association with an inner piston 12 and an outer piston 14. The pistons are held in place by a piston rod 16 having a shoulder 18 and a threaded portion for receiving a nut 20. Portions of the inner housing 22 and outer housing 24 are also illustrated in association with the diaphragm 10.

The diaphragm 10 includes an inner attachment portion 26 which is intended to extend between the inner and outer pistons 12 and 14. A central hole is provided in the inner attachment portion 26 for receipt of the piston rod 16; and the inner attachment portion 26 is generally circular in plan.

Associated with the housing members 22 and 24 is an outer attachment portion 28. The outer attachment portion includes a semi-circular channel 29 which acts in interlocking engagement with a rubber O-ring 30 positioned in a semi-circular groove in the housing. The semi-circular channel extends about the circumference of the diaphragm 10 and also helps to form a seal for the pumping chamber.

The outer attachment portion 28 has a ridge 31 on the outside surface of the semi-circular channel 29. This ridge is continuous around the circumference of the diaphragm and is offset from the center of the channel 29. This offset is employed to insure deformation inwardly toward the center of the diaphragm when the housing is clamped around the diaphragm.

When the housing is so clamped, the ridge 31 bends inwardly and downwardly. The pressure of the housing on the diaphragm is concentrated on the ridge 31 such that the relatively hard synthetic resin polymer is deformed sufficiently to form the seal.

The rubber O-ring 30 is placed on the air side of the diaphragm so that the harsh materials being pumped will not contact the O-ring. A conventional clamp band is used to hold the pump housing together around the diaphragm.

Located between the inner attachment portion 26 and the outer attachment portion 28 of the diaphragm is a flexure portion 32. The flexure portion 32 is annular in configuration and is concave on the air pressure side. The flexure portion is generally sheet like and the concavity allows for movement of the piston rod 16 without great resistance from the diaphragm itself.

Located on the pressure receiving side of the diaphragm are a number of concentrically arranged ribs 34. These ridges 34 are spaced substantially uniformly across the flexure portion 32 as can be seen in the drawing. A smooth transition between each rib and the main pressure side surface of the diaphragm 10 is used to prevent high stress points which could detract from the life of the diaphragm. The ribs 34 are configured to form an approximately sinusiodal surface on the diaphragm 10 wherein the valleys between the ribs provide a diaphragm thickness equal to the thickness of the unribbed portions of the diaphragm. The diaphragm thickness including a rib is almost twice the minimum thickness in the valleys between ribs.

The introduction of ribs on the diaphragm increase the moment of inertia resisting flexure along a line perpendicular to the longitudinal direction of the rib. Thus, the diaphragm of the present invention resists radial flexure more than conventional diaphragms. It has been found that this reduction in flexure adds to the life of TEFLON diaphragms. The addition of the ribs 34 also reduces the flexibility of the diaphragm to concentric flexure. Thus, the operative flexibility of the diaphragm in the direction in which it must flex to work is reduced. By increasing the thickness of the diaphragm at the ribs 34, greater strain is experienced by the areas of the diaphragm between ribs. However, it has been found that a net positive effect is gained by the use of the ribs 34.

As an example of one embodiment of the present invention, a diaphragm has been constructed having an overall diameter of 29.62 cm. (11 21/32"). The diaphragm thickness at the inner attachment portion 26, the outer attachment portion 28 and the valleys between the ribs 34 is 0.198 cm. (0.078"). The thickness of the diaphragm including the ribs 34 is 0.356 cm. (0.140"). The peaks of the ribs 34 are spaced 0.635 cm. (0.25") apart. There are ten such ribs in the flexure portion 32. The flexure portion has a width between the inner attachment portion 26 and the outer attachment portion 28 of 8.02 cm. (3.16").

The outer attachment portion 28 has a semi-circular channel having an inside radius of 0.357 cm. (9/64") and an outside radius of 0.556 cm. (7/32"). The ridge 31 is 0.079 cm. (1/32") high and has a base equal to its heighth.

Thus, an improved diaphragm has been devised by the present invention. While embodiments and applications of this invention have been shown and described, it would be apparent to those skilled in the art that many more modifications are possible without department from the inventive concepts herein described. The invention, therefore, is not to be restricted except by the spirit of the appended claims.

What is claimed is:

1. A pump assembly including an air chamber housing, a liquid chamber housing and a diaphragm positioned therebetween, said air chamber housing having an air sealing means adjacent said diaphragm for sealing the joint between said air chamber housing and said diaphragm, said liquid chamber housing having an annular channel adjacent to said diaphragm and said diaphragm having a convex annular member to mate with said annular channel wherein the improvement comprises a continuous ridge on the convex annular member, said ridge being inwardly of the center line of said convex annular member.

2. A pump assembly including an air chamber housing, a liquid chamber housing and a diaphragm positioned therebetween, said air chamber housing and said liquid chamber housing each having an annular channel adjacent said diaphragm, an O-ring positioned in said air chamber housing channel and said diaphragm having a semi-circular annular channel at said air chamber housing and liquid chamber housing channels wherein the improvement comprises a continuous ridge on the outer side of said semi-circular annular channel, said ridge being inwardly of the center line of said channel.

3. The pump assembly of claim 2 or claim 1 wherein said ridge is integrally formed with said diaphragm.

4. The pump assembly of claim 2 or claim 1 wherein said diaphragm is a synthetic resin polymer.

* * * * *